(12) United States Patent
Malm et al.

(10) Patent No.: US 7,279,526 B2
(45) Date of Patent: Oct. 9, 2007

(54) HETEROPHASIC PROPYLENE POLYMER

(75) Inventors: Bo Malm, Porvoo (FI); Pirjo Jååskelåainen, Porvoo (FI); Päivi Pitkånen, Porvoo (FI); Reijo Peralå, Porvoo (FI); Jari Lehtinen, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 149 days.

(21) Appl. No.: 10/468,059

(22) PCT Filed: Feb. 14, 2002

(86) PCT No.: PCT/EP02/01620

§ 371 (c)(1),
(2), (4) Date: Jan. 28, 2004

(87) PCT Pub. No.: WO02/072693

PCT Pub. Date: Sep. 19, 2002

(65) Prior Publication Data

US 2004/0116607 A1 Jun. 17, 2004

(30) Foreign Application Priority Data

Feb. 21, 2001 (EP) .................................. 01301521

(51) Int. Cl.
*C08L 23/00* (2006.01)
*C08L 23/04* (2006.01)
*C08L 9/00* (2006.01)
*C08L 25/02* (2006.01)

(52) U.S. Cl. ...................... 525/191; 525/232; 525/240; 525/241

(58) Field of Classification Search ................. 525/191, 525/232, 240, 241
See application file for complete search history.

(56) References Cited

U.S. PATENT DOCUMENTS 5,747,592 A * 5/1998 Huff et al. ................... 525/191

FOREIGN PATENT DOCUMENTS

| WO | WO98 21275 | 5/1998 |
| WO | WO98 54260 | 12/1998 |
| WO | WO98 59002 | 12/1998 |
| WO | WO 01 77224 | 10/2001 |

OTHER PUBLICATIONS

Amberg et al, Ethylene-Propylene Rubber, Industrial and Engineering Chemistry, May 1961, vol. 53, No. 5, pp. 368-370.*

* cited by examiner

*Primary Examiner*—Nathan M. Nutter
(74) *Attorney, Agent, or Firm*—Sughrue Mion Pllc.

(57) ABSTRACT

The invention provides a heterophasic propylene polymer composition comprising the following components: i) 60 to 90% wt, relative to the total weight of components i), ii) and iii), of a propylene polymer matrix comprising a propylene homopolymer and, optionally a propylene copolymer, said propylene polymer matrix having an ethylene content of no more than 5% wt; ii) wt 5 to 30% wt, relative to the total weight of components i), ii) and iii), of an elastomer; and iii) 5 to 25% wt, relative to the total weight of components i), ii) and iii), of an ethylene copolymer plastomer having a density of not more than 910 kg/m$^3$ and a melt flow rate MFR$_{2.16}$ (190° C.) of at least 0.5 g/10 minutes at 190° C. under a weight of 2.16 kg.

8 Claims, No Drawings

HETEROPHASIC PROPYLENE POLYMER

This Application is a 371 of PCT/EP02/01620, filed Feb. 14, 2002; the disclosure of which is incorporated herein by reference.

The invention relates to improvements in and relating to heterophasic polypropylenes, in particular heterophasic propylene copolymers in which a beneficial balance between the properties of impact resistance, stiffness and stress whitening resistance may be achieved.

Various polymer products exhibit the property known as stress whitening. Thus when such polymers are bent or impacted, the bending or impact zone turns an opaque milky colour even if the polymer is coloured. This is an undesirable property where the appearance of the polymer product is important, for example where the polymer is used in a retail product or as an external surface of a domestic or office item. Moreover, since stress whitening leads to surface roughening, it is undesirable where it is important to attain or maintain surface hygiene, e.g. in products which in use come into contact with food or medicine or which are used for medical or sterile manufacturing purposes.

Heterophasic polypropylene polymers, ie. polymers containing a propylene polymer matrix and an elastomer, have been found to be particularly vulnerable to stress whitening if their impact resistance is adequately high. Thus stress whitening increases with increased elastomer content while a homopolymer itself generally has very low stress whitening. As a result the acceptable end uses of heterophasic propylene polymers have been limited to some extent.

We have now found that an improved balance between impact resistance, stiffness and stress whitening resistance may be achieved by blending a heterophasic propylene polymer with a low density, high melt flow rate ethylene copolymer plastomer. Furthermore the resulting heterophasic polymer may have good stiffness, creep resistance and transparency.

Thus viewed from one aspect the invention provides a heterophasic propylene polymer composition comprising the following components:

i) 60 to 90% wt, relative to the total weight of components i), ii) and iii), of a propylene polymer matrix comprising a propylene homopolymer and, optionally, a propylene copolymer, said propylene polymer matrix having an ethylene content of no more than 5% wt;

ii) 5 to 30% wt, relative to the total weight of components i), ii) and iii), of an elastomer; and iii) 5 to 25% wt, relative to the total weight of components i), ii) and iii), of an ethylene copolymer plastomer having a density of not more than 910 kg/m³ and a melt flow rate $MFR_{2.16}$ (190° C.) of at least 0.5 g/10 minutes at 190° C. under a weight of 2.16 kg.

The matrix polymer, as stated above, must contain at least one polypropylene; however it is preferred for the matrix to contain two or more propylene polymers. Where the matrix polymer comprises two or more different propylene polymers these may be polymers with different monomer make up and/or with different molecular weight distributions. These components may have identical or differing monomer compositions and tacticities.

The matrix polymer may be produced in a polymerization stage effected in one or more polymerization reactors or by blending two or more compatible polymers having the desired molecular weight distributions or monomer make ups. Desirably a matrix polymer comprising two or more different propylene polymers may be produced by the use of two or more catalyst types in a one-reactor polymerization or alternatively by carrying out polymerization in two or more different polymerisation reactors (e.g. bulk and/or gas phase reactors; as bulk reactors, loop reactors are preferred) whereby to generate matrix polymers of the different desired molecular weight distributions or monomer make ups in the different polymerization reactors. This latter approach is preferred.

The matrix will preferably be a propylene homopolymer or a mixture thereof with a random propylene copolymer. Where it comprises a copolymer, the comonomers may include monomers copolymerizable with propylene, for example comonomers such as ethylene and $C_{4\text{-}20}$ mono or multiply unsaturated monomers, in particular ethylene and $C_{4\text{-}10}$ α-olefins, e.g. 1-butene or 1-hexene. Preferably, where a copolymer component is present this will be a relatively high molecular weight random copolymer. The comonomer content is relatively low, e.g. 0 to 5% wt, preferably 1 to 4% wt.

As monomer feedstock, particularly of $C_{2\text{-}3}$ α-olefins, may comprise small quantities of copolymerizable impurities, the term homopolymer is used herein to denote a polymer deriving at least 99% by weight from a single monomer.

In a bimodal matrix polymer, the higher molecular weight component is preferably a homopolymer or a random copolymer while the lower molecular weight component is preferably a higher crystallinity homopolymer.

The polymer matrix material is thus preferably a combination of a high molecular weight homopolypropylene or propylene random copolymer (e.g. with $C_2$ or $C_{4\text{-}10}$ α-olefin comonomers) and a low to moderate molecular weight, higher crystallinity homopolypropylene.

The production of polymers having the desired properties for the components of the matrix polymer may be achieved using techniques well known to those skilled in the art, e.g. by appropriate selection of catalyst systems (e.g. Ziegler Natta catalysts or metallocene or other single site catalysts), comonomers, polymerization reactor type and polymerization process conditions. Particularly preferably the matrix polymer is produced in a polymerization process using a supported Ziegler Natta catalyst system (especially a high yield Ziegler Natta system containing Ti, Cl, Mg and Al). Metallocene catalysts may also be used.

The matrix polymer constitutes 60 to 90%, preferably 70 to 80%, by weight of the overall heterophasic polymer composition components i), ii) and iii).

The second component of the heterophasic polymer composition of the invention is the elastomer.

The elastomer is preferably an α-olefin polymer, in particular a propylene polymer, more particularly a propylene copolymer with one or more copolymerizable monomers, e.g. as described above, particularly ethylene. The comonomer content is desirably relatively high e.g. 25 to 45%, preferably 30 to 40% by weight and the molecular weight is preferably relatively high. The molecular weight of such elastomers may be measured indirectly by measurement of intrinsic viscosity of the xylene soluble amorphous fraction (AM). The elastomer preferably has an intrinsic viscosity (IV of AM) measured in decalin at 135° C. according to ASTM method D1601-78 of 1.5 to 4 dL/g, more preferably 2 to 3.5 dL/g. Thus the elastomer is preferably a propylene-ethylene copolymer containing 25 to 45% wt ethylene and having an intrinsic viscosity (IV of AM) of 1.5 to 4 dL/g.

As with the matrix polymer, the elastomer may be produced by conventional gas phase α-olefin polymerization techniques; however it is preferably produced using a supported catalyst system, e.g. a Ziegler Natta catalyst system or a metallocene:alumoxane catalyst system.

The elastomer will constitute 5 to 30%, preferably 6 to 18%, by weight of the heterophasic polymer composition components i), ii), iii).

The elastomer may be blended in with the matrix polymer. However, more desirably it is produced by performing a second polymerization stage in the presence of particles of matrix polymer, e.g. as a second polymerization stage of a multistage polymerization. Preferably the combination of the matrix and elastomer polymers is produced in a two stage polymerization using two or more polymerization reactors, more preferably using bulk and gas phase reactors (especially fluidized bed gas phase reactors) especially preferably using a loop reactor followed by two gas phase reactors or by a loop and a gas phase reactor. In such a procedure, the catalyst system used may be varied between stages but is preferably the same for all stages. Especially preferably a prepolymerized heterogeneous (i.e. supported) catalyst is used.

While the catalyst may be a metallocene, it is preferred to use Ziegler Natta catalysts, e.g. an inorganic halide (e.g. $MgCl_2$) supported titanium catalyst, together with an aluminium alkyl (e.g. triethylaluminium) cocatalyst. Silanes, e.g. dicyclopentanedimethoxysilane (DCPDMS) or cyclohexylmethyldimethoxysilane (CHMDMS), may be used as external donors. Such catalyst systems are described in EP-A-491566, the contents whereof are hereby incorporated by reference.

Thus in one preferred embodiment the compositions of the invention are prepared by a process comprising the following steps:

a) polymerising propylene and optionally a further α-olefin comonomer in a first reactor whereby to produce a first polymer;

b) optionally further polymerizing propylene and optionally a further α-olefin comonomer in a further reactor in the presence of said first polymer whereby to produce a mixture of said first polymer and a second polymer;

c) polymerizing at least one α-olefin in a gas phase reactor in the presence of said first polymer and where present said second polymer whereby to produce a mixture of said first polymer and where present said second polymer and an elastomer; and d) blending said mixture of polymer and elastomer with an ethylene copolymer plastomer having a density of not more than 910 kg/m³ and a melt flow rate $MFR_{2.16}$ (190° C.) of at least 0.5 g/10 minutes at 190° C. under a weight of 2.16 kg; with the proviso that said process comprises as at least one of steps (a) and b) a propylene homopolymerization.

This process forms a further aspect of the invention.

In steps a) and b) of this process, in which the propylene polymer matrix is produced, the polymerisations are preferably effected in bulk (e.g. loop) or gas phase reactors. In step c), in which the elastomer is produced, two or more gas phase reactors in series may be used. Especially preferably the process involves in step a) a bulk reactor, especially a loop reactor, and in steps b) and c) gas phase reactors.

In such a process, molecular weight may be controlled for example by controlling hydrogen addition to the reaction mixture and monomer make-up by controlling feed rates of different monomers.

The first step is preferably a propylene homopolymerization. In an alternative preferred embodiment, matrix polymer production may involve firstly a propylene homopolymerisation and secondly a propylene-ethylene random copolymerisation producing a polymer mixture with an ethylene content of up to 5% wt, more preferably 1 to 4% wt. The elastomer production polymerisation stage is preferably a propylene/ethylene copolymerization, preferably performed at a lower temperature than the matrix polymerisation stage using a higher ethylene:propylene molar ratio, e.g. 0.45 to 1.0:1, preferably 0.50 to 0.80:1, and effected so as to achieve a $C_2$ content in the resultant polymer mixture (measurable by FT-IR) of 4 to 10% wt, especially 5 to 8% wt, and an amorphous fraction (i.e. a xylene soluble fraction) of 8 to 25% wt, especially 10 to 15% wt. This amorphous fraction preferably has an intrinsic viscosity (measured in decalin at 135° C.) of 1.5 to 4 dl/g, especially 2.0 to 3.5 dl/g, and an ethylene (i.e. ethylene monomer derived) content of 25 to 45% wt, especially 30 to 40% wt.

The third component of the heterophasic polymer composition of the invention is an ethylene copolymer plastomer. The plastomers used in the present invention may be produced for example by metallocene-catalyzed polymerization or other single site catalyzed polymerization, and have densities of no more than 910 kg/m³, preferably no more than 910 kg/m³, e.g. 875 to 900 kg/m³ and $MFR_{2.16}$ (190° C.) measured at 190° C. with a 2.16 kg load according to ISO 1133, of at least 0.5 g/10 min., e.g. up to 50 g/10 min. Such plastomers are available commercially (e.g. as Exact 4041 and Exact 2M011 from DEXplastomers of the Netherlands).

The plastomer is present in the heterophasic polymer composition as from 5 to 25%, preferably 10 to 20%, by weight of the total weight of composition components i), ii) and iii). Because the use of plastomers in heterophasic propylene polymer compositions affects the impact strength, the stress whitening resistance and the stiffness, the specific amount included will depend on the desired balance between these properties.

The plastomer may be added to the matrix and elastomer polymer compositions, for example by blending.

In a preferred embodiment, the composition of the invention comprises:

i) 60 to 90% by weight relative to the total weight of components i), ii) and iii) of a propylene homopolymer or a mixture of a propylene homopolymer and a random propylene copolymer having a $MFR_{2.16}$ (measured at 230° C. with a 2.16 kg load according to ISO1133) of 0.05 to 500 g/10 min. and a ethylene content of up to 5% wt;

ii) 5 to 30% by weight relative to the total weight of components i), ii) and iii) of a propylene-ethylene copolymer elastomer having an ethylene content of 25 to 45% by weight, the xylene soluble amorphous fraction of which has an intrinsic viscosity (IV of AM) of 1.5 to 4 dL/g; and iii) 10 to 25% by weight relative to the total weight of components i), ii) and iii) of an ethylene copolymer plastomer having a density in the range 875 to 910 kg/m³ and a $MFR_{2.16}$ (measured at 190° C. with a 2.16 kg load according to ISO1133) of more than 0.5 g/10 min.

Besides the matrix polymer, elastomer and plastomer, the heterophasic polymer composition of the invention may contain other components, e.g. conventional additives such as colours, nucleating agents, fillers, antioxidants, radiation stabilizers, etc. The use of inorganic, organic or polymeric nucleating agents is especially preferred. The use of nucleating agents is described in EP-A-826728, U.S. Pat. No. 5,362,782 and U.S. Pat. No. 5,258,464, the contents of which are hereby incorporated by reference.

The heterophasic polymer composition of the invention may be prepared for use by blending the components, preferably in an extruder-blender. The resultant blend may then be used for production of polymer end products, e.g.

pipes, mouldings, films, sheets, rods and fibres. It is particularly suitable however for use in the preparation of moulded or extruded items (such as containers, boxes, items of luggage etc), preferably using techniques such as extrusion, injection moulding and blow moulding.

Viewed from a further aspect the invention provides the use of a heterophasic polymer composition according to the invention, e.g. a composition in flowable particulate form, for the manufacture of polymer items, particularly items with high stress whitening resistance and/or impact resistance, e.g. for the manufacture of containers and container closures for foodstuffs or medicines, household appliances and components thereof, medical equipment and components thereof, automotive parts, items of luggage, boxes, and equipment for use in sterile manufacturing and components thereof, for example by a moulding or extrusion technique. Viewed from a further aspect the invention also provides polymer items produced from the heterophasic polymer compositions of the invention.

The invention will now be described further with reference to the following non-limiting Examples:

$MFR_{2.16}$ (T°) values referred to herein are measured at T° C. under a 2.16 kg load according to ISO 1133.

EXAMPLE 1

Preparation of a Broad Molecular Weight Propylene Copolymer Composition and Blending in of an Ethylene Copolymer Plastomer Heterophasic propylene copolymers were produced in a pilot plant having a loop reactor and two fluid bed gas phase reactors connected in series. The catalyst, cocatalyst and donor were fed to the loop reactor. The solid polymer from the loop reactor, containing the active catalyst, then entered the first and thereafter the second of the gas phase reactors.

A prepolymerised $MgCl_2$—supported Ti catalyst (prepared according to EP-A 491566) was used in the polymerisation. The cocatalyst was triethylaluminium (TEA) and the external donor was dicyclopentanedimethoxysilane (DCP-DMS). The Al/Ti mole ratio was 250 and the Al/donor mole ratio was 5.

In the loop reactor of the first stage, a propylene homopolymer was produced and the polymerisation was continued in the first gas phase reactor which produced a random propylene copolymer with an ethylene content of about 2 wt %. The polymerisation was further continued in the second stage, in the second gas phase reactor, where a propylene/ethylene copolymer elastomer was produced. The polymerisation temperature was 80° C. in the loop and the first gas phase reactor and 70° C. in the second gas phase reactor. The $MFR_{2.16}$ (230° C.) of the two stages were adjusted with separate hydrogen feeds. The elastomer was produced with a low comonomer ratio (C2/C3=0.54 (mol/mol)). The homopolymer matrix after the loop had a $MFR_{2.16}$ (230°) of 11 g/10 min and after the first gas phase reactor the $MFR_{2.16}$ (230° C.) was 0.4 g/10 min, and the polymer composition after the second stage had a $MFR_{2.16}$ (230° C.) of 0.37 g/10 min (after stabilisation and pelletising). Standard formulation with 5000 ppm Irganox B215 (from Ciba) and 700 ppm Ca-stearate was used.

The final copolymer had an ethylene content of 7 wt % (measured by Fourier transform infrared spectometry—FTIR) and a xylene soluble amorphous fraction (AM) of 12 wt %. The ethylene content of the amorphous phase (C2 of AM) was 34 wt % and the intrinsic viscosity of the amorphous fraction (measured in decalin at 135° C. according to standard procedures) (IV of AM) was 2.6 dl/g.

The copolymer was tested for mechanical properties by standard ISO tests. Specimens were cut from compression moulded plaques (4 mm thick). The results are set out in Table 1 below as sample P1. The stress whitening resistance was evaluated by a white blush test using a falling weight impacter (a weight of 25 kg with a drop of 20 mm). The minimum and maximum diameters of the resultant blushes were measured in mm.

To the copolymer, P1, was added 15 wt % of ethylene copolymer plastomer in a small twin screw extruder BE-25 from Berstorff (screw diameter=25 mm). The metallocene catalyst derived plastomer was from DEXplastomers in the Netherlands (Exact 2M011). The plastomer had a $MFR_{2.16}$ (190° C.) of 1.1 g/10 min and a density of 882 kg/m³. The pellets were then fed to the extruder using a melt temperature of 210° C. The final heterophasic polymer blend (Blend 1) had a $MFR_{2.16}$ (230° C.) of 0.56 g/10 min and an ethylene content of 17.8 wt %.

The mechanical properties of the heterophasic blend are set out in Table 1 below. The stiffness decreased as expected but the impact was clearly improved with a Charpy, notched impact at −20° C.=22 kJ/m² (cf very brittle for the base polymer). The stress whitening resistance remained at about the same level despite the much improved impact.

EXAMPLE 2

Preparation of a Broad Molecular Weight Propylene Copolymer Composition and Blending in of an Ethylene Copolymer Plastomer Heterophasic propylene copolymers were produced as in Example 1 except that the Al/external donor mole ratio was 8 and the matrix polymer was produced using two loop reactors in series. After the first loop reactor, the matrix polymer had a $MFR_{2.16}$ (230° C.) of 0.07 g/10 min and after the second loop reactor a $MFR_{2.16}$ (230° C.) of 0.33 g/10 min. The loop reactor temperature was 68° C. The elastomer was produced as in Example 1 and the final product had an $MFR_{2.16}$ (230° C.) of 0.26 g/10 min after pelletising. Irganox B215 and calcium stearate were used for formulation as in Example 1.

The final copolymer had a total ethylene content of 5.6 wt % and AM of 10.3 wt % with a C2 of AM of 32.2 wt % and IV of AM of 3.7 dl/g.

The mechanical properties were determined by ISO tests as in Example 1 and the results are set out in Table 1 below as sample P2.

The copolymer, P2, was blended with the plastomer as in Example 1. The $MFR_{2.16}$ (230° C.) of the blend (Blend 2) was 0.34 g/10 min.

The mechanical properties of the heterophasic blend are set out in Table 1 below. The impact stayed high even at −20° C. compared to brittle for the base polymer, P2. The stress whitening resistance was the same despite the big impact improvement.

TABLE 1

| test | Sample unit | P1 | Blend 1 | P2 | Blend 2 |
|---|---|---|---|---|---|
| Plastomer added | | wt % | | 15 | | 15 |
| $MFR_{2.16}$ (230° C.) | ISO1133 | g/10 min | 0.37 | 0.56 | 0.26 | 0.34 |
| Total ethylene | FTIR | wt % | 7 | 17.8 | 5.6 | 16.3 |
| ethylene in matrix | FTIR | wt % | 1 | — | | |
| AM | | wt % | 12 | | 10.3 | |
| C2 of AM | FTIR | wt % | 34 | | 32.2 | |
| IV of AM | decaline | dl/g | 2.6 | | 3.7 | |
| Tm of PP | DSC | ° C. | 160.2 | 157.7 | 167.1 | 166.5 |
| Compression mould Tensile strength | ISO1873-2 ISO527-2 | MPa | 24.6 | 19.7 | 27.8 | 21.7 |
| Elongation at yield | ISO527-2 | % | 7 | 9.3 | 4.4 | 4.9 |
| Tensile Modulus | ISO527-2 | MPa | 1190 | 900 | 1570 | 1190 |
| Charpy impact, RT | ISO179/1eA | $kJ/m^2$ | 50 | 72 | 65 | 70 |
| Charpy impact, 0° C. | " | $kJ/m^2$ | 7.5 | 54 | 12.6 | 55 |
| Charpy impact, −20° C. | " | $kJ/m^2$ | 3.5 | 22 | 5.7 | 27 |
| White blush minimum/maximum diameters | dropped weight | mm/mm | 19/23 | 20/24 | 23/24 | 22/26 |

EXAMPLE 3

Preparation of a Broad Molecular Weight Propylene Copolymer Composition and Blending in of an Ethylene Copolymer Plastomer The heterophasic copolymer was produced as in Example 1 except that the aluminium to external donor mole ratio was 8. After the first reactor, the homopolymer had a $MFR_{2.16}$ (230° C.) of 270 g/10 min and after the second reactor the matrix polymer had a $MFR_{2.16}$ (230° C.) of 26 g/10 min. The elastomer was produced as in Examples 1 and 2 except that the comonomer ratio (C2/C3) was 0.61 mol/mol, and the hydrogen was adjusted so that the final copolymer had a $MFR_{2.16}$ (230° C.) of 12.1 g/10 min after pelletising.

The final copolymer had a total ethylene content of 6.5 wt % and AM of 11.4 wt %. The C2 of AM was 38 wt % and IV of AM was 3.1 dl/g.

The copolymer was tested for mechanical properties by standard ISO tests from injection moulded specimens. The results are set out in Table 2 below as sample P3.

The copolymer, P3, was blended with the plastomer as in Example 1. The results of the mechanical properties of the final polymer blend are set out in Table 2 below as sample Blend 3. The falling weight impact showed good ductility down to −20° C., and the Charpy notched result was also clearly improved. The stress whitening resistance measured by the white blush diameter was still of the same order as the copolymer (P3).

EXAMPLE 4

Preparation of a Broad Molecular Weight Propylene Copolymer Composition and Blending in of an Ethylene Copolymer Plastomer The heterophasic copolymer was produced as in Example 2. After the first reactor the homopolymer product had an $MFR_{2.16}$ (230° C.) of 9.2 g/10 min and in the second reactor a random copolymer was produced with an ethylene content of about 2 wt %. The elastomer was produced in the third reactor as in Examples 1 and 2 and the $MFR_{2.16}$ (230° C.) after pelletising was 7.7 g/10 min.

The copolymer had a total ethylene content of 5.9 wt % and the AM was 10.7 wt %. The C2 of AM was 34 wt % and the IV of AM was 2.5 dl/g. The copolymer was tested as in Example 3 and the results are set out in Table 2 below as sample P4.

The copolymer, P4, was blended with the plastomer as in Example 1. The results of the mechanical tests of the final polymer blend are set out in Table 2 below as sample Blend 4.

This copolymer blend had very good falling weight impact down to −20° C. as the starting copolymer had less ductility already at room temperature. The Charpy value was also clearly improved. The stress whitening resistance measured by the white blush was still of the same order as the copolymer (P4).

EXAMPLE 5

Preparation of a Broad Molecular Weight Propylene Copolymer Composition and Blending in of an Ethylene Copolymer Plastomer The starting heterophasic copolymer was produced as in Example 4 except that the second reactor produced a propylene homopolymer. The matrix polymer had an $MFR_2$ of 4.4 g/10 min. The elastomer was produced in the third reactor with a comonomer molar ratio (C2/C3) of 0.62. The final copolymer had a $MFR_{2.16}$ (230° C.) of 3.3 g/10 min (after stabilisation and pelletising).

The final copolymer had an ethylene content of 5.6 wt % and the AM was 11.7 wt %. The C2 of AM was 32.7 wt % and the IV of AM was 2.3 dl/g.

The copolymer was tested as in Examples 3 and 4 and the results are set out in Table 2 below as sample P5.

The copolymer, P5, was blended with the plastomer as in Examples 1 to 4. The mechanical properties of the final copolymer blend are set out in Table 2 below as sample Blend 5.

The blend had very good impact properties down to −20° C., with a stress whitening resistance comparable to that of the base copolymer (P5).

EXAMPLE 6 (COMPARATIVE)

Preparation of a Broad Molecular Weight Propylene Copolymer Mixture and Blending in of LLDPE Produced by Ziegler-Natta Catalyzed Ethylene Polymerization The heterophasic copolymer was produced as in Example 3 except that more elastomer was produced in the third reactor.

The resulting copolymer had a $MFR_{2.16}$ (230° C.) of 11 g/10 min (after stabilisation and pelletising).

The copolymer (P6) had an ethylene content of 9.2 wt % and the AM was 21.4 wt %. The C2 of AM was 31.4 wt % and the IV of AM was 3 dl/g. The copolymer was tested and the test results are set out in Table 2 below as sample P6.

The copolymer, P6, was blended with polymer as in Examples 1 to 5 except that in place of the plastomer was used a Ziegler Natta catalyst produced LLDPE with a $MFR_{2.16}$ (190° C.) of 30 g/10 min and a density of 917 kg/m³. Two blends were produced with the addition of 10 wt % and 20 wt % (blend copolymer samples Blend 6.1 and Blend 6.2) LLDPE. The copolymer and blends were tested and the results are set out in Table 2 below. The impact properties were improved with the lower amount of LLDPE (10 wt %) and the stress whitening resistance was unchanged. However, with the higher amount of LLDPE (20 wt %) while the stress whitening resistance was improved the impact properties started to drop. Because the LLDPE is more crystalline (higher density) than the plastomer used according to the invention, the ethylene/propylene rubber interphase is too low to act as a compatabiliser between the matrix polymer and the high quantity of LLDPE

EXAMPLE 7 (COMPARISON)

A heterophasic copolymer was prepared as in Example 6 but with a lower elastomer content. This copolymer (P7) had $MFR_{2.16}$ (230° C.) of 12 g/10 min and an ethylene content of 5.0% wt. Copolymer P7 was blended with 5 and 15% wt of LLDPE as in Example 6 to produce samples Blend 7.1 and 7.2 and with 5 and 15% wt of a plastomer (Exact 4041) with $MFR_{2.16}$ (190° C.) of 2.6 g/10 min and 881 kg/m³ density to produce Samples Blend 7.3 and 7.4.

The copolymer and blends were tested as in the previous Examples and the results are set out in Table 3 below. From the results it can be seen that use of plastomer rather than LLDPE had little effect on stiffness, improved stress whitening, but much improved low temperature impact strength, especially at the higher addition level.

EXAMPLE 8 (COMPARATIVE)

A heterophasic copolymer was produced as in Example 5 but with a higher elastomer content in order to obtain impact and stiffness properties of the same order as in Blend 5 of Example 5. The ethylene content of this copolymer (P8) was 9.7% wt, $MFR_{2.16}$ (230° C.) was 3.8 g/10 min, the amorphous phase (AM) (i.e. the xylene soluble fraction) was 22.6% wt, and C2 of AM was 35% wt, IV of AM was 2.4 dl/g.

The copolymer was tested as in the previous Examples and the results are set out in Table 3 below. As can be seen, the impact and stiffness properties are as for Blend 5 of Example 5; however the stress whitening resistance was poor.

TABLE 2

| test | Sample unit | P3 | Blend 3 | P4 | Blend 4 | P5 | Blend 5 | P6 | Blend 6.1 | Blend 6.2 |
|---|---|---|---|---|---|---|---|---|---|---|
| $MFR_{2.16}$ (230° C.) final pellets | ISO1133 | g/10 min | 12.1 | 9 | 7.7 | 6.5 | 3.3 | 3 | 11 | 10.5 | 11.3 |
| Total ethylene | FTIR | wt % | 6.5 | 15.8 | 5.9 | 17.7 | 5.6 | 16.6 | 9.2 | 17.6 | 25.7 |
| AM | | wt % | 11.4 | | 10.7 | | 11.7 | | 21.4 | | |
| IV of AM | decaline | dl/g | 3.1 | | 2.5 | | 2.3 | | 3 | | |
| C2 of AM | FTIR | wt % | 38 | | 34 | | 32.7 | | 31.4 | | |
| Tm of PP | DSC | ° C. | 162.5 | 163.4 | 162 | 162.2 | 165.6 | 165.5 | 162.9 | 163.4 | 163.1 |
| Tm of PE copolymer | | ° C. | | | | | | | | 119.4 | 120.1 |
| Injection moulding | ISO1873-2 | | | | | | | | | | |
| Tensile modulus | ISO527-2 | MPa | 1290 | 1100 | 1390 | 1170 | 1490 | 1200 | 1010 | 890 | 840 |
| Charpy, notched RT | ISO179/1eA | kJ/m² | 7.6 | 11 | 7.4 | 9.4 | 10.8 | 63.5P | 18.1 | 55 | 46.1 |
| Charpy, notched, 0° C. | " | kJ/m² | | 7.4 | 4.3 | 7.4 | 5.6 | 30.6P | 9.8 | | |
| Charpy, notched, −30° C. | " | kJ/m² | 3.9 | 5.2 | 3.8 | 3.8 | 4.1 | 4.3 | 6.6 | 6.4 | 7.8 |
| White blush minimum/maximum diameter | dropped weight | mm/mm | 20/21 | 24 | 19/21 | 18 | 14 | 14/15 | 16 | 15 | 12 |
| Instrumentated falling weight RT | ISO6603-2 | | | | | | | | | | |
| Total energy, | | J | 17 | 36 | 30 | | | | | | |
| Etot type/failure | | | br/d | d-br/d-d/br | duct (2) d/br-br/d(8) | | | | | | |
| 0° C. Total energy, Etot | | J | 10 | | 20 | | 28 | 50 | 45 | 37.5 | 33.5 |
| type/failure | | | brittle | | br/d-br | | d/br | duct | duct | duct | duct |
| −20° C. Total energy, Etot | | J | <10 | 40 | <20 br | 55 | 23 | 52 | 46 | 40 | 27 |
| type/failure | | | br/breaks | d/br | | duct | br/d (7) br (3) | duct | duct (5) d/br (5) | duct | d/br |
| Plastomer/LLDPE added | | wt % | | 15 | | 15 | | 15 | | 10 | 20 | duct = ductile
d/br = ductile/brittle (failure with yielding)
br/d = brittle/ductile (failure at yielding)
br = britt = brittle
P = partial break

TABLE 3

| | test | Sample unit | P7 | Blend 7.1 | Blend 7.2 | Blend 7.3 | Blend 7.4 | P8 |
|---|---|---|---|---|---|---|---|---|
| MFR$_{2.16}$ (230° C.) final pellets | ISO1133 | g/10 min | 12.0 | 11.5 | 14 | 11 | 10.3 | 3.8 |
| Total ethylene | FTIR | wt % | 5.0 | 9.5 | 16.5 | 8 | 13.8 | 9.7 |
| AM | | wt % | | | | | | 22.6 |
| IV of AM | decaline | dl/g | | | | | | 2.4 |
| C2 of AM | FTIR | wt % | | | | | | 35 |
| Tm of PP | DSC | ° C. | 163.2 | 163.6 | 163.1 | 163.6 | 162.9 | 165.9 |
| Tm of PE copolymer | | ° C. | | 121.5 | 121.9 | | | |
| Injection moulding | ISO1873-2 | | | | | | | |
| Tensile modulus | ISO527-2 | MPa | 1450 | 1380 | 1230 | 1330 | 1190 | 1190 |
| Charpy, notched RT | ISO179/1eA | kJ/m$^2$ | 6.6 | 7.3 | 8.3 | 8 | 20.3 | 58P |
| Charpy, notched, 0° C. | " | kJ/m$^2$ | 3.6 | 2.6 | 2.4 | 3.5 | 3.9 | 12.7 |
| Charpy, notched, −30° C. | " | kJ/m$^2$ | — | 2.1 | 1.4 | 2.1 | 2.2 | 9.3 |
| White blush minimum/maximum diameter | dropped weight | mm/mm | 15/16 | 12 | 7/11 | 11/12 | 8/10 | 21 |
| Instrumentated falling weight RT | ISO6603-2 | | | | | | | |
| Total energy, Etot type/failure | | J | 26.5 br/d | 34 duct | | 32 duct | | |
| 0° C. Total energy, Etot type/failure | | J | 14 br/d(6) br(4) | 18 duct(1) br/d-br | 40 duct(8) d/br | 24 d/br-br/d | 42 duct | 60 duct(8) d/br(2) |
| −20° C. Total energy, Etot type/failure | | J | | 9 cr.br | 11 br | 43 duct(2) d/br | 46 d/br | |
| Plastomer/LLDPE added | | wt % | 0 | 5 (LLDPE) | 15 (LLDPE) | 5 | 15 | 0 | duct = ductile
d/br = ductile/brittle (failure with yielding)
br/d = brittle/ductile (failure at yielding)
br = britt = brittle
P = partial break

The invention claimed is:

1. A heterophasic propylene polymer composition comprising the following components:
   (i) 60 to 90% wt, relative to the total weight of components (i), (ii) and (iii), of a propylene polymer matrix comprising a propylene homopolymer and a random propylene copolymer, said propylene polymer matrix having an ethylene content of no more than 5% wt;
   (ii) 5 to 30% wt, relative to the total weight of components (i), (ii) and (iii), of an ethylene-propylene copolymer elastomer comprising 25 to 45% wt % of ethylene; and
   (iii) 5 to 25% wt, relative to the total weight of components (i), (ii) and (iii), of an ethylene copolymer plastomer having a density of not more than 910 kg/m$^3$ and a melt flow rate MFR$_{2.16}$ (190° C.) of at least 0.5 g/10 minutes at 190° C. under a weight of 2.16 kg,
   wherein the random propylene copolymer comprises a repeating unit derived from ethylene or a C$_{4-10}$ unsaturated monomer.

2. The composition as claimed in claim 1, wherein component (ii) has an intrinsic viscosity of the xylene soluble fraction of 1.5 to 4 dL/g.

3. The composition as claimed in claim 1, wherein component (iii) is a plastomer produced by metallocene or other single single-site catalyst catalysed polymerisation.

4. The composition as claimed in claim 1, wherein the content of the repeating unit derived from ethylene or a C$_{4-10}$ unsaturated monomer in the random propylene copolymer is 1 to 4 wt %.

5. The composition as claimed in claim 1, wherein component (ii) accounts for 6-18 wt % of the composition.

6. The composition as claimed in claim 1, wherein component (i) is prepared using a Ziegler-Natta catalysis.

7. The composition as claimed in claim 1, wherein the elastomer is an ethylene-propylene copolymer comprising 30 to 40% wt % of ethylene.

8. The composition as claimed in claim 1, wherein components (i) and (ii) are prepared using an identical Ziegler-Natta catalysis.

* * * * *